United States Patent [19]

Saluja

[11] 4,107,769
[45] Aug. 15, 1978

[54] BALANCED SINGLE HORIZONTAL SUSPENSION ARM

[75] Inventor: Satinder K. Saluja, Erie, Pa.

[73] Assignee: American Sterilizer Company, Erie, Pa.

[21] Appl. No.: 779,498

[22] Filed: Mar. 21, 1977

[51] Int. Cl.² ............................................. F21V 21/18
[52] U.S. Cl. ..................................... 362/402; 248/280
[58] Field of Search ................ 362/402, 401; 248/280, 248/284, 292

[56] References Cited

U.S. PATENT DOCUMENTS

| | | | |
|---|---|---|---|
| 1,644,231 | 10/1927 | Bosworth | 248/292 |
| 2,416,910 | 3/1947 | Crosby et al. | 248/280 |
| 2,941,776 | 6/1960 | Lauterbach | 362/402 X |
| 3,041,060 | 6/1962 | Jacobsen | 248/280 X |
| 3,856,251 | 12/1974 | Miller | 362/401 X |

Primary Examiner—Richard L. Moses
Attorney, Agent, or Firm—Charles L. Lovercheck

[57] ABSTRACT

A hollow lamp arm swingably connected to a support at a first point and having an internal concentric rod swingably connected to the base at a second point spaced from the first point. A bearing on the rod is slidably received in the arm and helical counter-balance compression spring is supported between the bearing and the support. The bearing has a spherical race inside connected to the rod so that the rod can swing relative to the arm.

10 Claims, 2 Drawing Figures

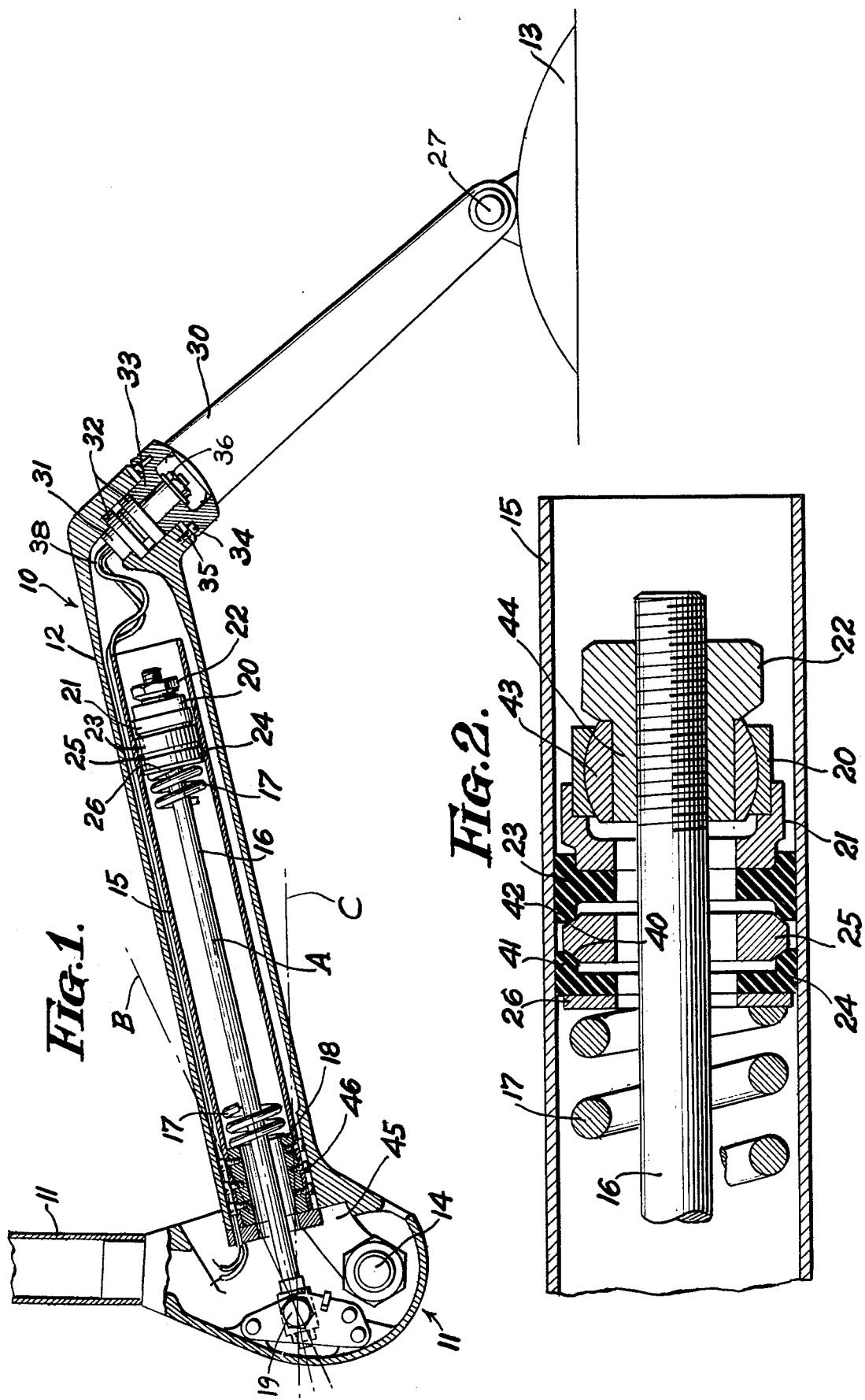

BALANCED SINGLE HORIZONTAL SUSPENSION ARM

GENERAL DESCRIPTION OF THE INVENTION

The design concept disclosed herein provides a counter-balance through the utilization of a compression spring which induces a counter-balance force/moment proportional to displacement. Proper relative geometrical orientation of the system pivots allows the restraining moments to "track" closely with the applied system moments which vary according to the angular position of the arm. Close-correlation of restrictions to applied moments allows conformance to small positioning force and zero drift requirements.

REFERENCE TO PRIOR ART

U.S. Pat. No. 1,087,807 shows a telephone support using a counter-balance spring, but the lamp does not show the unique spherical bearing arrangement nor does it teach the spacing and orientation and pivots as found in applicant's present invention.

U.S. Pat. No. 1,573,799 shows a light support arm comprising a compression spring that does not have applicant's novel features.

U.S. Pat. Nos. 808,983; 2,287,577; 2,665,102; and 2,941,776 and British Pat. Nos. 785,363 and 1,111,294 likewise show various types of support arms which do not incorporate applicant's novel structure.

OBJECTS OF THE INVENTION

It is an object of the invention to provide an improved support arm for a lamp or the like.

Another object of the invention is to provide a support arm that is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a longitudinal, cross-sectional view of the lamp support and lamp according to the invention.

FIG. 2 is an enlarged cross-sectional view of the bearing structure taken on line 2—2 of FIG. 1.

DETAILED DESCRIPTION OF THE DRAWINGS

Now, with more particular reference to the drawings, the lamp support is generally shown at 10. The support base 11 is suitable for attachment to a tube or pipe suspended from ceiling or other suitable support. A hollow arm 12 is swingably connected to the base at pivot 14 by the bracket 40. The lamp head 13 is rotatably connected to the arm 12 by means of the rotatable connection 23, which is not a part of this invention.

The tube 15 is fixed to the arm 12 by the bracket 40 held in place by screws 41 and the rod 16 is generally concentric to the tube 15 and is pivoted to the base at its first end by pivots 19 at a position spaced from the first pivot 14 at a position and in angular relation to the vertical as will be described hereinafter. Bushings 23 and 24 each have flanges 41 and 42 which are flared outwardly by spacer 25 so that the flanges form line contact with the inner periphery of tube 15 and exert a frictional force thereon.

The outer race of bearing 20 nests in the adapter 21 which holds it concentric with the bushings and spacer. The distal end of the rod 16 has nut member 22 fixed to it by suitable threads or the like, and the nut 22 has a reduced size part that receives the inner race of the bearing 20 on it. The assembly, made up of the bearing, bushing, spacer, adapter and washer, forms a stop for spring 17. The adapter 21, the bushings 23 and 24 and washer 26 each has a central opening that is large enough to allow the rod 16 to swing freely relative to the tube 15.

The end of helical compression spring 17 opposite bearing 20 rests on the end 18 of bracket 40 which is fixed to tube 15 by the screws 40 and the arm 12. It will be noted that when the arm is in the position shown, rod 16 is concentric to tube 15 and arm 12. When the arm 12 swings from the position A shown in full lines upward to the position B or downward to the position C shown in phantom lines, the rod 16 swings relative to the tube 15 and arm 12. This swinging movement is permitted by the spherical bearing 20 shown.

The lamp head 13 is connected to the arm 12 through the yoke 30. The yoke 30 is connected to the arm by the stud 31, which extends through the bearing 32 and rests on shoulder 33. A nylon stop 34 is held to the yoke by stud 35 and a nut 36 on the stud 31 holes the assembly together.

Bearing 20 is supported on rod 16 and held against the nut 22 by the force of compression springs 17. Compression spring 17 is received on rod 16 and is compressed between washer 26 and the stop 18 formed by the end of bracket 40. Tube 15 is held to the bracket 40 by screws 41. Spacer 25 has inclined edges 40 which engage flanges 42 on the outer periphery of the bushing 28. Bushing 28 may be made of material having the properties of nylon and the edges 40 of the bushing force the flanges to flare outwardly and make line contact with the inner periphery of the tube 15, thereby exerting a frictional force between the inside of the tube and the flanges causing the arm 12 to tend to remain in any position it may be brought to. Wires 43 may extend through the arm between the inside of the arm and the outer periphery of the tube 15.

The bearing 20 has an outer race that is received in the counterbore of bushing 21 and the inner race 43 has an external spherical surface that forms sliding contact with the internal complementary-shaped surface of the outer race thereby allowing the rod 16 to swing relative to the tube 15.

The bushings 23 and 24 are made of nylon. The bearing assembly, made up of hollow bushings 23 and 24, spacer 25, assembly 21 and bearing 20, are all supported by the reduced size portion 44 on the nut 22. Thus, the rod 16 extends through the enlarged openings through the bushings, spacer, adapter and washer 26 and allows the rod 16 to swing freely therein.

With the arm rotated at an angular position $\theta$ above or below the horizontal, the applied moment due to weight W of the lamp support 10 and lamp 13 rotating about pivot point "o" (14) at distance L (arm length) of the arm to the base as a function of angulation is:

$$M_a = W(L \cos \theta)$$

At any instant, the applied moment is counterbalanced by the preset force F of spring 17, which is housed within the suspension arm 12 and acting a distance "e" from the pivot "o" k4 to pivot 19. Thus, the restraining moment is:

$$M_r = F \times e$$

Since the applied moment is a function of angular position, it is necessary that the restraining moment also vary with the angle proportionally to the applied variation in order to maintain balance at any position. This is accomplished by designing the connection linkage between the compression spring 17 and the arm pivot 14 to product angulation influences on both "F" and "e". The kinetic linkage produces variations in spring length (and hence variations in applied spring force about the preset value) during arm motion. Increasing spring force is encountered during downward arm motion and decreasing forces during upward motion. Also, moment arm "e" decreases during downward motion and increases during upward motion.

The initial balance position was chosen as the point of maximum applied moment with the center of gravity of the system positioned on a horizontal centerline passing through the pivot "O" . (This point corresponding to 11° angulation of the pivot arm above horizontal.) Spring force preset required for balance under this condition was determined to be 422 lbs.

It is determined that the maximum imbalance is approximately 29 in.-lbs. at the upper and lower position limits. This imbalance represents less than 3.0% of the applied moment and is restrained by frictional force influences inherent within the design configuration.

POSITIONING FORCE REQUIREMENTS

To impart motion to the arm, it is necessary to overcome the static friction influences within the dynamic members plus any imbalance. Once these restraining influences are exceeded, positioning is obtained.

The amount of force required for positioning is predicted by deriving a force balance between an externally derived input at the handle and the system frictional forces.

MANEUVERABILITY

In addition to providing suspension arm counterbalance capabilities, the system also allows rotational capabilities of the yoke within the arm and the lighthead within the yoke. Total 360° rotation for each pivot is impeded through the incorporation of fixed mechanical stops. Orientation of the stops allows conformance to field of use requirements.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A lamp support comprising,
a base,
a hollow arm,
first pivot means swingably supported on said base,
a lamp head supported on the distal end of said hollow arm,
a tubular surface means in said hollow arm generally concentric thereto,
a rod in said tubular surface generally concentric thereto,
a helical compression spring in said tubular surface and bracket means on said arm engaging the said end of helical spring adjacent said base,
second pivot means on said base pivotally connecting said rod to said base at a position spaced from said first pivot means and bearing means pivoted to the distal end of said rod,
said bearing means engaging a second end of said spring and being slidably received on said tubular surface and engaging said helical spring and forming a stop therefor,
said bearing having means allowing said rod to swing relative to a tube whereby the counter-balancing moment of said pivot by said spring is substantially equal to the acting moment of said lamp on said arm about said first-mentioned first pivot point.

2. The lamp support recited in claim 1 wherein said bearing means comprises,
a bearing having spherical means thereon,
said bearing having a first race member resting on a nut means on the end of said rod,
and a second race member supported on said ball engaging said compression means.

3. The lamp support recited in claim 1 wherein said second pivot means is spaced above said first pivot means and on the opposite side of a vertical line passing through said first pivot means opposite said lamp.

4. The lamp support recited in claim 1 wherein said second pivot means is spaced from said first pivot means a distance equal to approximately 2.67 inches at an angle from the vertical approximately equal to 20.56°.

5. The lamp support recited in claim 1 wherein said bearing comprises,
an inner race having an external surface conforming to a part of a sphere and an external race having an internal surface conforming to said surface on said inner race and means on said outer race slidably received in said tube and engaging said helical springs.

6. The lamp support recited in claim 5 wherein said bearing slidably engages the internal surface of said tube comprising,
a first bushing adapter means supported on said outer race and having a bore therein freely receiving said rod,
a second bushing having a flange,
a spacer between said bushings freely receiving said rod and having an external chamfered surface engaging said flange on said bushings urging said flange outward,
means on said second bushing engaging said helical springs,
said rod being adapted to swing inside said first bushing, said second bushing and said spacer.

7. The lamp support recited in claim 6 wherein said bearing means comprises,
a first bushing means,
a second bushing means,
spacer means between said first bushing means and said second bushing means urging the periphery of said bushing means outward,
adapter means on said second bushing means receiving the outer race of said bearing, said first bushing means having means thereon engaging said spring.

8. The lamp support recited in claim 6 wherein said chamfered surfaces incline outwardly and toward the center of said bushing whereby said flange on said first bushing and flange on said second bushing are formed outwardly and form sliding line contact with the inner periphery of said tube providing a frictional force thereon urging said lamp to remain in a position to which it is moved.

9. In combination, a lamp and a balanced suspension arm for supporting said lamp on a support member, said suspension arm comprising,
- an elongated hollow arm,
- a cylindrical, internal surface means fied to said arm,
- means swingably supporting said arm on said support member,
- means supporting said light on the distal end of said arm,
- a rod extending through said hollow, cylindrical surface,
- means swingably supporting a first end of said rod on said support member,
- a bearing assembly on a second end of said rod,
- said bearing assembly comprising,
- a first hollow circular bushing,
- a second hollow circular bushing,
- and a hollow spacer member between said first bushing and said second bushing,
- means on said spacer member for forcing the outer periphery of said bushing members outwardly into engagement with said internal, cylindrical surface,
- a hollow circular adapter member,
- said adapter member, said first bushing, said second bushing,
- and said adapter member having bores therein substantially larger than said rod and receiving said rod,
- whereby said rod can swing freely therein,
- said adapter member having means thereon supporting said second bushing,
- a nut threadably supported on the second end of said rod,
- said nut having a reduced size portion extending toward said adapter,
- a bearing having inner race received on said reduced size portion of said nut and supported thereby,
- an outer race supporting said adapter member,
- and a compression spring received on said rod between said second bushing and the second end of said rod,
- and stop means on said arm supporting the end of said spring remote from said bushing.

10. The lamp recited in claim 9 wherein said means supporting said lamp on said arm comprises,
- a yoke rotatably supported on the distal end of said arm,
- said lamp means supported on said yoke at the end thereof remote from said arm.

* * * * *